Sept. 28, 1948. K. A. KAIL 2,450,239
AVIATION TRAINER
Filed July 29, 1942 4 Sheets-Sheet 1

KARL A. KAIL
INVENTOR.
BY Donald V. Hillier
ATTORNEY

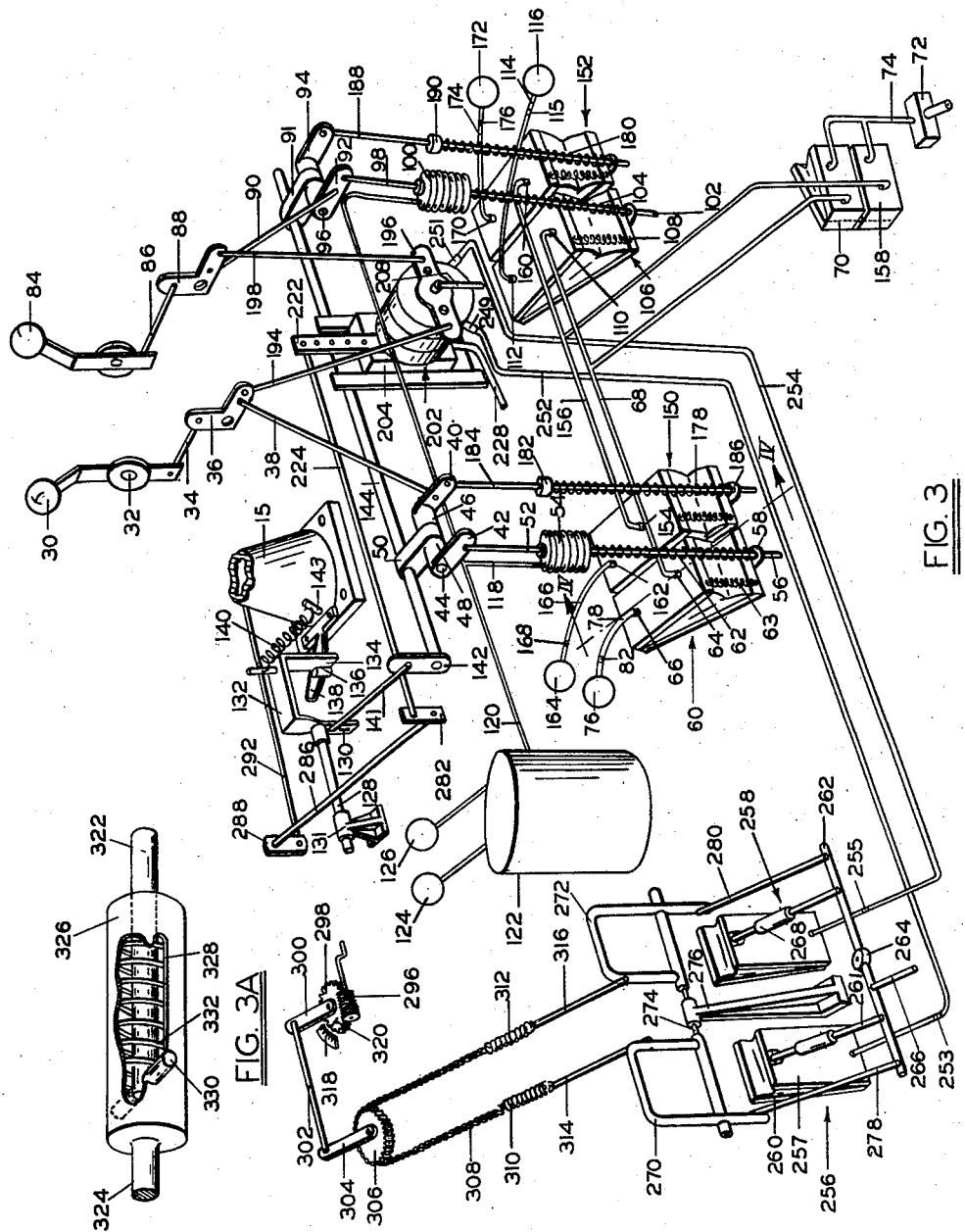

Sept. 28, 1948.  K. A. KAIL  2,450,239
AVIATION TRAINER
Filed July 29, 1942  4 Sheets-Sheet 3
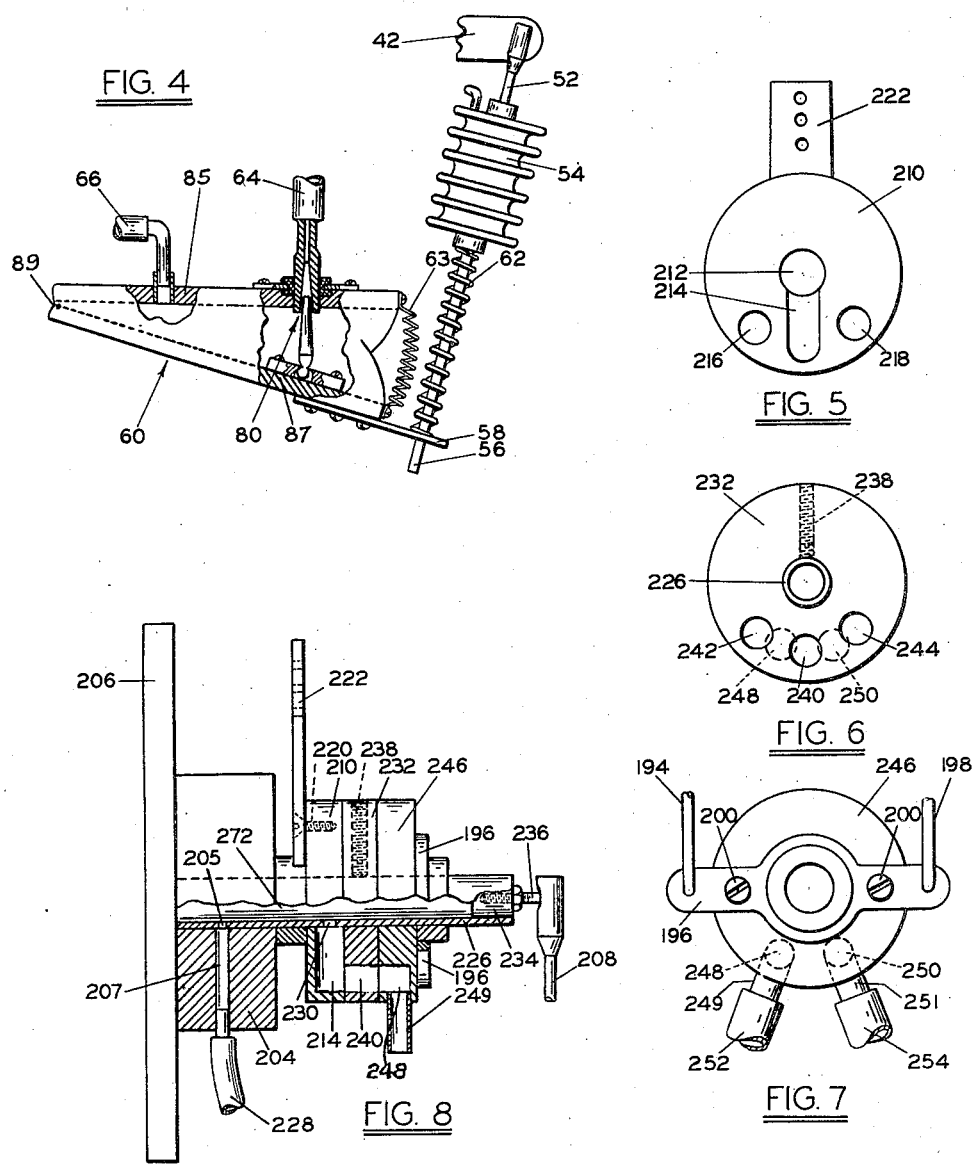
KARL A. KAIL
*INVENTOR.*
BY *Donald V. Hillier*
AT TORNEY Sept. 28, 1948.                K. A. KAIL                 2,450,239
                            AVIATION TRAINER
Filed July 29, 1942                              4 Sheets-Sheet 4

KARL A. KAIL
  *INVENTOR.*

BY Donald T. Hillier
          ATTORNEY

Patented Sept. 28, 1948

2,450,239

UNITED STATES PATENT OFFICE 2,450,239

AVIATION TRAINER

Karl A. Kail, Montrose, Pa., assignor to Link
Aviation, Inc., a corporation of New York Application July 29, 1942, Serial No. 452,739

33 Claims. (Cl. 35—12)

This invention relates to trainers for aviators, and comprises means for simulating in a grounded aviation trainer the response of an airplane and many of the instruments thereof to certain conditions of flight.

My invention has been found to be particularly useful and will be described in connection with an aviation trainer which constitutes essentially a simulated aircraft fuselage mounted upon a universal joint whereby the trainer can be turned, pitched, and banked in all the usual flying positions of a real plane. Such a trainer is disclosed in U. S. Patent 1,825,462. United States Patent 2,099,857 discloses means whereby the functioning of certain of the instruments in an airplane, such as the altimeter, vertical speed indicator and air speed indicator may be simulated in such a trainer.

One of the principal objects of this invention is to provide in such a trainer means whereby the functioning of certain of the instruments in an aircraft other than those mentioned above may be simulated.

One of my more specific objects is to provide means whereby the functioning of the tachometer and manifold pressure gauge in a plane may be simulated in a grounded aviation trainer, and also means whereby the functioning of these instruments in a dual motored aircraft may be simulated in such a trainer. I propose to provide means whereby a change in the attitude of such a trainer will change the indications of the manifold pressure gauge and the tachometer in the trainer in the same manner that a like change in the attitude of a plane in flight affects the manifold pressure gauge and tachometer therein.

It is also a specific object of this invention to provide means whereby a change in the throttle setting in the trainer will change the indicated assumed manifold pressure and motor speed in the same manner that a like change in the throttle setting of a plane in flight will change the reading of the manifold pressure gauge and tachometer therein.

Still a further object of this invention is to provide means in such a trainer whereby the assumed motor manifold pressure will be varied by a change in the assumed altitude of the trainer.

My invention will be illustrated when it is adapted to simulate in a grounded aviation trainer the functioning of the manifold pressure gauge or gauges and tachometer or tachometers in a plane equipped with a fixed pitch propeller, but it will be understood by those skilled in the art that many features of my invention are readily adaptable to simulating the functioning of the manifold pressure gauge or gauges and tachometer or tachometers in a plane equipped with other kinds of propellers—for example variable pitch, or as they are often called, constant speed propellers.

In a companion abandoned application Serial No. 448,906 filed June 29, 1942, wherein the present inventor is named as a joint inventor means are disclosed whereby in an assumed dual motor trainer the air speed indicator, vertical speed indicator and altimeter may be made to respond to a change in the setting of either of the throttles in the trainer in the same manner that the same instruments in a dual motored plane in actual flight respond to a corresponding change in the setting of one or both of the throttles in the plane. It is a further object of the present invention to incorporate in an assumed dual motor trainer having certain instruments that respond to a change in the setting of either of the throttles means whereby each of the manifold pressure gauges and tachometers responds to a change in the setting of but one of the throttles in said trainer, i. e., the throttle which is assumed to be associated with the same engine that the responding manifold pressure gauge and tachometer is assumed to be associated.

Also disclosed in said companion application are means whereby an assumed dual motor trainer may be made to rotate about its vertical axis when the throttle settings therein are unequal, thereby simulating the "rudder loading" which occurs in a dual motor plane when the engines are not synchronized. It is another object of the present invention to provide means whereby even though an unequal setting of the throttles be present the turning of the trainer caused by such unequal throttle settings will be decreased as the trainer is banked, thereby simulating the diminishing of "rudder loading" as a real plane is banked.

Also, it is an object of my invention to provide manually operable means under the control of the student in the trainer for compensating for such a "rudder loading" in order that the rotation of the trainer caused by unequal throttle settings may be prevented.

Other objects and advantages will become apparent as the description proceeds, reference now being made to the accompanying drawings forming a part of this application and wherein like reference numerals indicate like parts.

In the drawings,

Fig. 3 is a diagrammatic illustration of most of the principal parts of this invention.

Fig. 3A is a view of a compensating link that may form a part of my invention.

Fig. 4 is a view of one of the bellows, the sectional part taken on the line IV—IV in Fig. 3.

Figs. 5, 6, and 7 are detailed views of the parts of one of the valves of this invention.

Fig. 8 shows the parts drawn in the three preceding figures in assembled relation.

Figure 9:
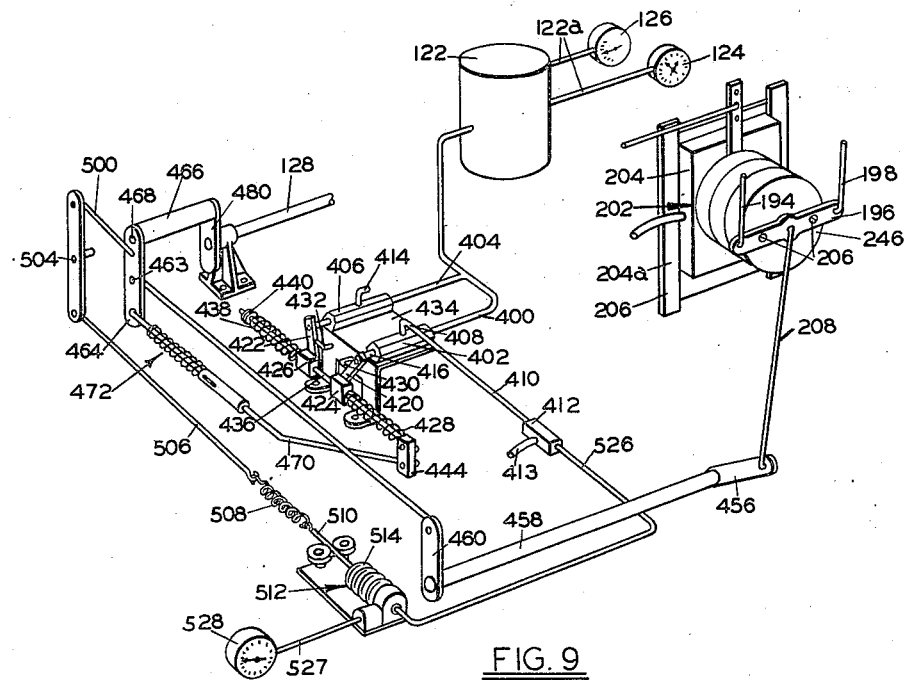

Fig. 9 is a diagrammatic illustration of a portion of the control system of my invention.

Figure 10:
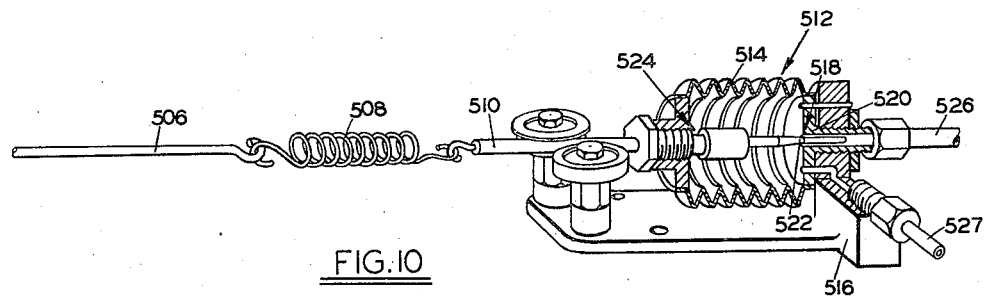

Fig. 10 is a detailed view of the air speed regulator bellows.

Figure 1:
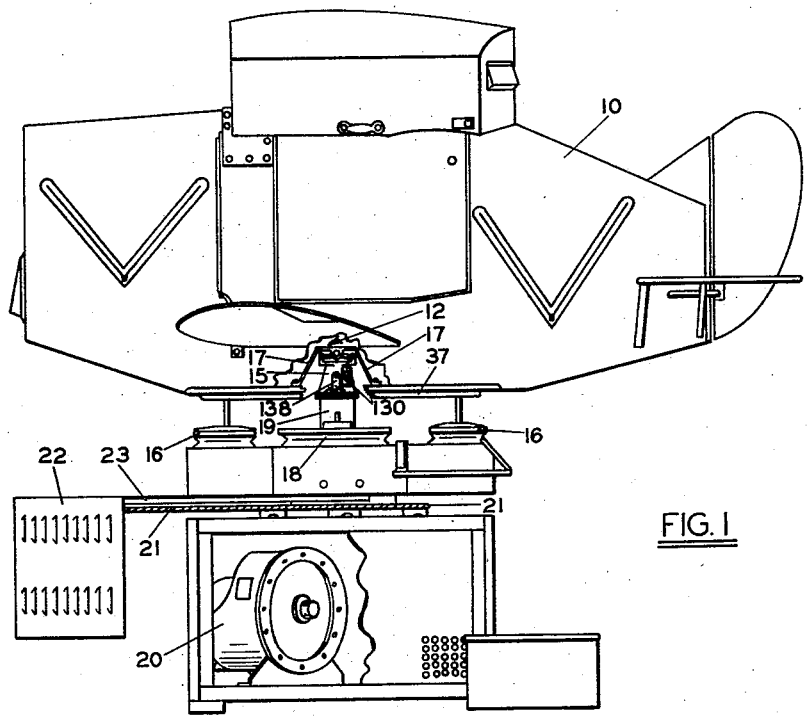
Fig. 1 is a side view of an aviation trainer in combination with which this invention is particularly useful, certain parts being cut away for purposes of illustration.

Referring to Fig. 1, it will be seen that such a trainer comprises a fuselage 10 mounted upon a universal joint designated generally as 12 which in turn rests upon a central supporting member 15. Two pairs of bellows 16 and 18 are provided, only one of the bellows 18 being visible, however, in Fig. 1. Each pair of bellows is connected by separate connecting lines to the turbine 20 which is the source of vacuum and in each of the connecting lines is a valve operated by the control stick in the trainer. These connecting lines, valves, and stick are not shown. The bellows 16 are fore and aft of the trainer and are referred to as the elevator bellows while the valve between these bellows and the source of vacuum 20 is referred to as the elevator valve. The other pair of bellows 18 and the corresponding valve are referred so as the aileron bellows and valve respectively. Upon the pushing forward of the stick in the trainer by the student, the elevator valve is moved to such a position that vacuum is admitted to the forward bellows 16 while at the same time atmosphere is admitted to the rearward bellows 16, causing the forward bellows to collapse and the rearward bellows to expand, thus forcing the trainer to a diving attitude. By pulling the stick rearward, the bellows respond in an opposite manner and the trainer assumes a climbing attitude. In a similar manner, by movement of the stick sideways, the trainer may be made to bank in the desired direction. It will therefore be realized that such a trainer may be made to pitch and bank in any desired direction.

There is also connected to the trainer fuselage by means of extending arm 23 a turning motor 22, the output shaft of which has a pulley (not shown) fixedly mounted thereupon. The main support 15 of the fuselage 10 is mounted on another support 19 which in turn is rotatably mounted in a receiving member (not shown) which at all times remains stationary, and an annular groove (not shown) is integral with this fixed member. An endless belt 21 is placed around this annular groove as well as around the fixed pulley on the end of the output shaft of said turning motor 22. The turning motor 22 is also connected to the source of vacuum 20, there being in the connecting means a rudder valve which is operated by the rudder pedals in the trainer. When the student in the trainer applies either foot to one of the rudder pedals, the rudder valve link is moved and the rudder valve is affected so that reduced air pressure is admitted to the appropriate side of the turning motor (which is in reality a double acting air motor) and the output shaft of the turning motor is rotated in the correct direction, thereby rotating the pulley fixed thereto. Since the endless belt 21 wraps around the annular groove which is integral with the stationary member that receives supporting member 19, the rotation of the fixed pulley of the turning motor will cause the turning motor 22 to turn itself, extending arm 23, trainer fuselage 10, universal joint 12, and support 15 about the vertical axis of support 19, which axis is also considered to be the vertical axis of the trainer fuselage.

All the above functioning forms no part of the present invention except as combined with the novel features of the instant invention, and, therefore, a more detailed description is omitted, but for a full disclosure reference is made to the above-mentioned U. S. Patents 1,825,462 and 2,099,857. However, in the light of the foregoing discussion, the objects of the instant invention and the following means of attaining them will be more readily understood.

Reference is made to Fig. 3 which discloses means used in the preferred embodiment of my invention for simulating in a grounded aviation trainer the indications of the manifold pressure gauge of a plane in actual flight. Those familiar with the rules of aviation realize that whenever the throttle associated with a given motor in a real plane is moved a change in the gauge which indicates the manifold pressure of that motor results.

In that figure, it will be seen that a simulated throttle lever 30 is pivotally mounted at the point 32 and has pivotally connected to its lower end a link 34, the other end of which is pivotally attached to the upper end of bell crank 36. Attached to the other end of bell crank 36 is link 38, the lower end of which is pivotally attached to arm 40. Arm 40 has a companion arm 42, and both of these arms are rigidly affixed to shaft 44. Right angle extension 46 is integral with arm 40 while a corresponding part 48 is integral with arm 42. Shaft 44 is free to turn in arm 50 which in turn is rigidly affixed to shaft 144. Because of this arrangement it will be realized that whenever link 38 is moved up or down through a movement of bell crank 36, link 34 and throttle 30, both of the arms 40 and 42 will be moved in the same direction and to the same extent.

Pivotally connected to the end of arm 42 farther from shaft 44 is the upper end of link 52 and rigidly affixed to the lower end of link 52 is the upper end of bellows 54 which is preferably made of metal and of the expansible, contractible type. Rigidly affixed to the lower end of this bellows is link 56, the lower end of which is free to slide up and down in the extension 58 of bellows designated generally as 60. A spring 62 is interposed between the lower end of the bellows 54 and the extension 58.

The upper portion of the bellows 60 which is the assumed left motor manifold pressure bellows is rigidly affixed to any suitable part of the trainer fuselage while the lower portion is movably pivoted at the left end (as seen in Fig. 3) of the upper fixed part of this bellows which is made air-proof by means of suitable covering material.

Bellows 60 shown in detail in Fig. 4 has two ports 64 and 66, port 64 being connected by means of hose 68 to regulator bellows 70 which in turn is connected to manifold 72 by means of hose 74. Regulator bellows 70 may be of any suitable type providing it maintains across its two sides a desired constant differential pressure. Port 66 is connected to manifold pressure gauge 76 by means of hose 78. Bleed hole 82 is provided in hose 78 which connects port 66 with the manifold pressure gauge 76. This gauge, as inferred above, indicates the assumed left motor manifold pressure. In Fig. 4 it will be seen that within bellows 60 is a needle valve designated generally by 80, which valve is positioned opposite port 64. Thus, when this needle valve is opened, reduced air pressure from manifold 72 will be applied through connection 74, regulator bellows 70, hose 68 and port 64 to manifold pressure bellows 60. Manifold pressure gauge 76 will indicate the change in pressure within that bellows.

As stated above, the upper part 85 of bellows 60 is stationary while the lower part 87 is pivotally connected to the upper part at the left end 89 as seen in Fig. 4. Rigidly connected to the opposite end of part 87 is the extension 58 previously mentioned. Vertical rod 56 is free to slide in the central opening in this extension. Spring 63 prevents the bottom 87 of bellows 60 from falling down too far when there is not sufficient vacuum within that bellows.

As the air pressure within bellows 60 becomes gradually decreased through the action of manifold 72, this bellows gradually collapses until the pressure therewithin and the action of spring 62, which two forces tend to expand bellows 60 and open needle valve 80 exactly equal the atmospheric pressure on the outside of bellows 60 which latter force tends to collapse said bellows and thus close needle valve 80. When these opposing forces are balanced, vacuum source 72 will exhaust from bellows 60 the same amount of air that enters that bellows through bleed hole 82 in hose 78.

Because of the above equation of forces it will be realized that by varying the compression upon spring 62 the amount of vacuum necessary within bellows 60 to balance the atmospheric pressure on the outside of this bellows may be varied. This varying vacuum will in turn vary the reading of manifold pressure gauge 76. Hence, by moving the lower end of metal bellows 54, the compression upon spring 62 will be changed as will the vacuum within bellows 60. The greater the compression upon spring 62 the greater will become the vacuum within bellows 60 and the greater will be the indicated manifold pressure.

Those familiar with the rules of aviation will realize that an opening of the throttle associated with an engine in a plane will cause the manifold pressure gauge associated with that engine to indicate an increased manifold pressure. Referring to Fig. 3, an opening of throttle 30, i. e., a movement to the left in that figure, will cause link 34 to move to the right and the lower end of bell crank 36 will be moved downward as will link 38. The end of arm 40 to which link 38 is connected will also be moved downward and through the action of shaft 44 the corresponding end of arm 42 will move in the same direction. Link 52 and bellows 54 will also move downward as will link 56. Because the lower end of bellows 54 is so moved, the compression upon spring 62 will become increased through the action of the spring upon extension 58, this spring will force the bottom portion 86 of bellows 60 to move downward and needle valve 80 will be opened. Vacuum from manifold 72 will therefore be applied to bellows 60. The vacuum within bellows 60 will become gradually increased until the pressure within that bellows and the compression upon spring 62 exactly equal the atmospheric pressure upon the outside of that bellows. Consequently, a gradual increase in the indicated manifold pressure will result until this point is reached.

Figure 2:
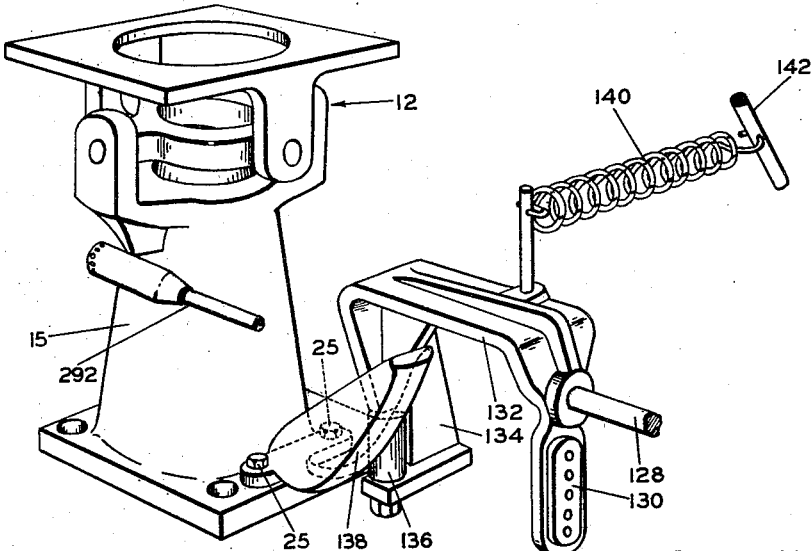
Fig. 2 is a diagrammatic illustration of the universal joint and certain associated parts of such a trainer.

On the other hand, if throttle 30 be closed, that is, moved to the right in Fig. 2, link 38 will be moved upward as will the right ends of arms 40 and 42, link 52 and bellows 54. The compression upon spring 62 will therefore become decreased and the needle valve 80 will tend to close. Less air will therefore be exhausted from the bellows than enters through bleed hole 82, and the pressure therein will increase until the compression upon spring 62 plus the pressure within bellows 60 exactly equals the atmospheric pressure on the outside of this bellows. When this point is reached as much air will be exhausted by manifold 72 as enters the bellows through bleed hole 82. A gradual decrease in the manifold pressure as indicated by gauge 76 will occur until the point of equilibrium is reached.

It will be seen from Fig. 3 that throttle 84, link 86, bell crank 88, link 90, member 91, arms 92 and 94, shaft 96, link 98, bellows 100, vertical link 102, spring 104, bellows designated generally as 106, spring 108, ports 110 and 112, connection 114, bleed 115, and manifold pressure gauge 116 comprise a second independent manifold pressure system which is identical in all respects with the one which has been described in detail above. A further description of this system is unnecessary, it being deemed sufficient to state that this latter system which governs the reading of manifold pressure gauge 116 is assumed to be associated with the assumed right motor in the trainer. It will be realized that an opening of throttle 84, i. e., a movement to the left in Fig. 3 will cause an increased compression upon bellows 104, a greater vacuum within bellows 106 will result, and manifold pressure gauge 116 will indicate an increased assumed right motor manifold pressure in the same manner that a similar movement of throttle 30 affects the reading of manifold pressure gauge 76. Also, a closing of throttle 84, that is, a movement to the right in Fig. 3, will result in a decreased indication as given by manifold pressure gauge 116.

The foregoing arrangement, therefore, provides means in a grounded aviation trainer whereby the simulated motor manifold pressures in the case of an assumed single or dual motor trainer may be made to vary with a change in the setting of a throttle or throttles in the same manner that the manifold pressure gauge or gauges in a plane in actual flight vary with a corresponding change in throttle settings.

The second factor which affects the manifold pressure of the motors of a plane in flight is the attitude of the ship, that is, whether it be climbing or diving. The following means are incorporated in this invention in order that the reading of manifold pressure gauges 76 and 116 will respond to a change in the attitude of the trainer.

Referring to Figs. 2 and 3, horizontal shaft 128 is mounted for rotation in brackets 131, only one of which is shown, and the end of shaft 128 nearer central support 15 has rigidly affixed thereto a lever 130, the upper end of which has integrally connected to it a horizontal extension 132 which in turn has an integral depending member 134. Suitably mounted in the lower part of depending member 134 is a roller 136. Rigidly affixed to the central support 15 of the trainer by means of bolts 25 is an upwardly extending member 138. A spring 140 which has one end connected to any fixed portion 143 of the trainer fuselage maintains roller 136 at all times in contact with extension 138. Shaft 128 and horizontal extension 132 extend laterally of the trainer fuselage. As shown in Fig. 1, the bottom 37 of the trainer fuselage 10 is suspended below universal joint 12 by means of brackets 17 but the trainer fuselage and the complete mechanism shown in Fig. 3 except central support 15 also rests upon the top of the universal joint. Because of the fact that the mechanism shown in Fig. 3 is positioned below universal joint 12 and at the same time it moves with the floor of the fuselage 37 which rests upon the top of this universal joint by means of members 17, referring to Fig. 3, it will be understood that when the trainer fuselage 10 pitches in simulation of climbing, shaft 128 moves ahead of its level flight position but roller 136 and the lower part of depending arm 134 cannot so move because of stationary extension 138. Shaft 128 will therefore turn in brackets 131 and the lower end of lever 130 will move toward the rear of the trainer, pushing before it link 141 to which it is pivotally connected and the upper end of arm 142 which in turn is pivotally connected to the other end of link 141. Inasmuch as this arm is rigidly affixed to shaft 144 which runs transversely of the trainer fuselage, this shaft will be made to rotate in a clockwise direction as viewed from the end upon which arm 142 is mounted. Arm 50, as stated previously, is rigidly mounted upon shaft 144 and it will therefore move in the same direction. Shaft 44 and the ends of arms 40 and 42 which are rigidly affixed thereto will therefore be moved downward. In this instance these two arms will pivot about an axis running transversely of the trainer fuselage and through the point where the link 38 is attached to arm 40. Arms 92 and 94 which correspond to arms 40 and 42 because of the action of arm 91 will respond in the same manner. The end of arms 42 and 92 farther from shaft 144 will therefore go up and the compression upon the springs 62 and 104 will become lessened as will the vacuum within bellows 66 and 106 and a decrease in the indicated manifold pressures as shown by gauges 76 and 116 will result.

If the trainer were pitched in simulation of a dive, shaft 128 will be moved to the rear of its level flight position and spring 140 will maintain roller 136 against upwardly extending member 138. Shaft 128 will be made to turn in brackets 131 in a direction to cause the lower end of lever 130 to move toward the head of the trainer. Link 141 will move likewise and the upper end of arm 142 will move in a counterclockwise direction as viewed from the left side of the trainer. Shaft 144 will move in the same direction and the end of arm 50 in which horizontal shaft 44 is pivotally mounted will be moved upward. Arm 91 which corresponds to arm 50 will react in the same manner and the ends of arms 40 and 42 which are connected to shaft 44 and the ends of arms 92 and 94 which are connected to shaft 96 will also be moved upward. Arm 42 will pivot about an axis running transversely of the trainer and through the point where link 38 is attached to arm 40 and therefore the end of arm 42 to which link 52 is connected will be moved downward. An increased compression upon spring 62 will result as will an increased indicated manifold pressure. Likewise, arms 92 and 94 will pivot about an axis running transversely of the trainer and through the point where link 90 is attached to arm 92. The end of arm 92 to which link 98 is attached will be moved downward and an increased compression upon spring 104 will result, thereby causing an increased vacuum within bellows 106 and an increased manifold pressure as indicated by gauge 116.

By the foregoing means, therefore, the indicated assumed manifold pressure of each of the motors assumed to be in the trainer will respond to a change in the trainer attitude in the same manner that the manifold pressure of the motor or motors of a plane in actual flight will respond to a change in the attitude of the ship. The manifold pressure of a plane in actual flight depends to a certain extent upon the altitude at which the ship is flying—the higher the altitude, other factors remaining constant, the lower the manifold pressure. The following means may form a part of my invention to simulate the effect of altitude upon manifold pressure.

Referring to Fig. 9 an equalizer tank 122 is positioned inside the fuselage 10. Connected to the equalizer tank 122 by means of the air connections 122a are the simulated altimeter 124 and vertical speed indicator 126 which function as described in U. S. Patent 2,099,857 to indicate to the student in the trainer 10 the assumed altitude and vertical speed of the trainer.

In Fig. 9 it will be seen that the equalizer tank 122 is connected by means of air line 400 to the climb valve 402 and by means of air connection 404 to the dive valve 406. The port 408 of climb valve 402 is connected by means of air line 410 to manifold 412, while the port 414 of dive valve 406 communicates with the atmosphere. Manifold 412 is connected by air line 413 to a suitable source of reduced air pressure. The detailed construction of the climb and dive valves in and of themselves form no part of this invention and for detailed description thereof reference is made to the above mentioned U. S. Patent 2,099,857. For the purposes of this invention it is sufficient to know that each of the valves 402 and 406 is a needle valve, in the case of the climb valve 402 the needle and seat being between the port 408 leading to the manifold 412 and the air line 400 leading to the equalizer tank 122. In the case of the dive valve the needle and seat are between the port 414 leading to the atmosphere and the air line 404 connected to the equalizer tank. Connected to the needles in each of the valves is a threaded stem the outer ends of which are designated by the numbers 416 and 418, the former being associated with the climb valve and the latter with the dive valve.

Fixedly connected to the outer end of stem 416 is an operating arm 420 and a corresponding member 422 is likewise connected to the stem 418. Each of the operating arms 420 and 422 is pivotally connected to one of the pair of blocks 424 or 426 which are slidably mounted upon reciprocating link 428. A pair of stops 430 and 432 are fixed to the front of the mounting bracket 434 upon which the climb and dive valves are mounted. When arm 420 is in contact with its stop 430 climb valve is closed and when arm 422 is in contact with its stop 432 the dive valve is closed.

Fixedly attached to the central portion of reciprocating link 428 between blocks 424 and 426 is engaging member 436, so when reciprocating link 428 moves toward the head of the fuselage 10, engaging member 436 moves in the same direction pushing block 426 which in turn carries arm 422, thereby opening dive valve 406 to permit communication between port 414 leading to the atmosphere and equalizer tank 122. At the same time compression spring 438 which encircles the fore end of link 428 and is held thereon by block 426 and stop 440 will remain in its normal state of compression, but spring 442 which encircles the rear end of link 428 and is held thereon by block 424 and stop 444 will be contracted because block 424 and arm 420 are held stationary by stop 430. Therefore, such a movement will not open the climb valve 402. However, a movement of link 428 to the rear of the fuselage 10 will open climb valve 402, thus admitting reduced air pressure from manifold 412 to the equalizer tank 122, but this movement will not affect the positions of block 426 and arm 422 which are held by stop 432, so the dive valve 406 will remain closed.

Referring to Figs. 3 and 9, it will be seen that there is pivotally connected to the rear arm of bell crank 36 the vertical link 194 and there is similarly connected to the rear end of bell crank 88 the vertical link 198. The lower ends of each of the links 194 and 198 are pivotally connected to opposite ends of the operating arm 196 which is fixedly attached by means of screws 200 to the outer leaf 246 of the three-leaf valve assembly designated generally 202. This three-leaf valve is attached to the manifold 204 in a manner that will be later described in detail, so that the assembly 202 and manifold 204 may slide with respect to the track 206 which is fixedly mounted to a suitable part of the interior of the fuselage 10. Pivotally attached to the center of cross arm 196 is the upper end of vertical link 208, the lower end of which is pivotally attached to the unpivoted end of arm 456. The other end of arm 456 is rigidly affixed to transverse horizontal shaft 458 which is rotatably mounted upon the bottom 37 of the fuselage 10. On the left end of shaft 458 is affixed arm 460 to the upper end of which is pivotally connected the rear end of link 462. The forward end of link 462 is pivotally connected to the central portion of the pitch action walking beam 464 at the point 463, as shown. This beam is pivotally attached to the horizontal stub shaft 466 at the point 468. To the lower end of the pitch action walking beam 464 is attached the fore end of link 470 which extends rearwardly and is attached to the rearward end of the reciprocating link 428, to which reference has been previously made. Link 470 comprises the well-known conventional centering device designated generally by 472.

Still referring to Figs. 3 and 9 it will be noted that a movement of lever 30 in either direction will move link 194 up or down depending upon the direction of movement of the lever 30. The same is true of the lever 84 and the vertical link 198. When link 194 is moved, link 198 remaining stationary, the arm 196 pivots about the point at which it is attached to link 198. The left end of arm 196 moves up or down, the outer leaf 246 of the three-leaf valve assembly 202 rotating about its center as will later be more fully disclosed, and the whole valve assembly 202 and manifold 204 sliding in track 206. This sliding movement will cause a movement of the link 208. On the other hand, when throttle lever 84 is moved, lever 30 remaining stationary, the vertical link 198 moves up or down and the arm 196 is pivoted about the point at which it is attached to link 194. The same sliding movement occurs, resulting in a movement of vertical link 208. The conclusion may be drawn that the link 208 is differentially responsive to the movements of the levers 30 and 84. A pushing forward of either of the levers 30 or 84 results in a downward movement of link 208 while the opposite movement of either of these levers results in an upward movement of this link.

A downward movement of link 208, referring to Fig. 9, results in a movement to the rear of links 462 and 470, beam 464 pivoting about the point 468. The movement to the rear of link 470 results in a similar movement of reciprocating link 428, the climb valve 402 is opened an amount dependent upon the movement of link 208 and the equalizer tank 122 is connected to the manifold 412. The pressure within tank 122 is reduced and the altimeter 124 indicates the assumed increase in altitude of the trainer and vertical speed indicator 126 indicates the assumed rate of climb of the trainer. On the other hand, an upward movement of link 208 results in an opening of the dive valve 406, and the tank 122 is connected to the atmosphere through port 414, so the pressure in the tank builds up at a rate dependent upon the extent to which the dive valve is opened. The altimeter shows the lower assumed altitude and the vertical speed indicator reflects the assumed rate of descent. It will be appreciated that the rate of change in pressure within tank 122 depends upon the differential movements of the levers 30 and 84, just as the altitude of a dual motor plane depends upon the differential movements of the throttle levers therein. Consequently the instruments 124 and 126 respond to the settings of levers 30 and 84 in the same manner that their real counterparts respond to the setting of the throttle levers in a real plane.

The second basic factor which affects the altitude of a plane in actual flight is the attitude of the plane, i. e. whether it is climbing, diving or flying straight and level.

It has been previously explained that when the fuselage 10 pitches in simulation of the climbing of a plane in actual flight the lower end of lever 130 moves toward the rear. Therefore in Fig. 3 the shaft 128 which is affixed to arm 130 will move counterclockwise as seen from the left. Referring to Fig. 9 such a movement of the shaft 128 will result in a counterclockwise rotation of the arm 480 which is affixed upon the left end of shaft 128. The stub shaft 466 therefore moves toward the head of the trainer carrying therewith the upper end of walking beam 464 which in this instance pivots about the point 463. The lower end of arm 464 moves to the rear as do the links 470 and 428 and the climb valve 402 is opened thus resulting in a decrease in the pressure within the equalizer tank 122. Altimeter 124 reflects the increase in assumed altitude of the trainer while the vertical speed indicator 126 indicates the assumed rate of ascent.

It will be appreciated that when the fuselage 10 is pitched in simulation of the diving of a plane in actual flight, the shaft 128 is rotated in the opposite direction resulting in a movement of the link 428 toward the head of the fuselage 10. The dive valve 406 is therefore opened connecting the atmosphere port 414 with the equalizer tank 122 and an increase in pressure in the equalizer tank results. The altimeter 124 reflects the decrease in the assumed altitude of the trainer and the vertical speed indicator 126 shows the simulated rate of descent.

In view of this explanation it will be appreciated that the pressure within the equalizer tank 122 varies in accordance with the assumed altitude of the trainer—the higher the pressure within the tank 122 the lower the assumed altitude. The pressure within the tank 122 may therefore be used as a measure of the assumed altitude of the trainer and this pressure depends upon the successive combined positions of the levers 30 and 84 combined with pitching attitude of the fuselage 10 together with the length of time that these successive settings and attitudes have been maintained. Thus the same factors affect the pressure within the equalizer tank 122 as affect the altitude of a real plane in actual flight.

Referring to Fig. 3, the altitude compensator bellows 54 and 100 are connected by air lines 118 and 120 to the tank 122. Inasmuch as the pressure within tank 122 always varies in accordance with the assumed altitude of the trainer, so will the pressure within altitude compensator bellows 54 and 100. As the pressure within equalizer tank 122 and bellows 54 and 100 changes these two bellows will expand or contract, and as they do this the compression upon the respective springs 62 and 104 is also changed. An expansion of bellows 54 and 100 will cause an increased compression upon the springs 62 and 104 as was explained above, the vacuum within the associated bellows 60 and 106 will become greater and an increased assumed manifold pressure indication will be given by the appropriate manifold pressure gauges 76 and 116. On the other hand, a decrease in the pressure within equalizer tank 122 will cause a contraction of the altitude compensator bellows 54 and 100, a decreased compression upon springs 62 and 104 will result, as will a decreased vacuum within bellows 60 and 106. Manifold pressure gauges 76 and 116 will indicate a decreased manifold pressure. It is to be noted that the assumed manifold pressures of both of the motors assumed to be in the trainer are equally affected by any change in the pressure within equalizer tank 122. This is in strict accordance with the varying of the manifold pressures of all of the motors in the plane with a change in the altitude of the plane.

It will be realized, therefore, that my invention comprises means for varying the assumed motor manifold pressures of a grounded aviation trainer according to the assumed altitude of the trainer.

As far as indicating the assumed manifold pressure of the motor or motors in a grounded aviation trainer is concerned, it may be concluded that my invention provides means whereby the indicated manifold pressure will depend upon the same factors as does the manifold pressure of the motors of a plane in actual flight, these factors being three in number: first, the setting of the throttle or throttles, second, the assumed altitude of the trainer, and finally, the attitude of the trainer.

As stated near the beginning of this description, it is a principal object of this invention to provide means whereby the functioning of the tachometer (which instrument indicates the number of revolutions per minute of the motor with which it is associated) in a real plane in flight may be simulated in a grounded aviation trainer. Referring to Fig. 3, it will be seen that two bellows designated generally as 150 and 152 are provided, the former being the assumed left motor tachometer bellows and the latter being the assumed right motor tachometer bellows. Each of these two bellows is identical in every respect with the bellows 60 and 106 which, it will be recalled, are the assumed left and right motor manifold pressure bellows respectively. Tachometer bellows 150 has a port 154 which is connected to vacuum supply line 156 and regulator bellows 158 is interposed between this bellows and the manifold 72. Regulator bellows 158 is identical in construction with regulator bellows 70 and therefore it may be of any suitable type provided it maintains at all times across its two sides a constant differential pressure. Tachometer bellows 152 has a port 160 which is also connected to the same vacuum supply line 156 to which tachometer bellows 150 is also connected. Tachometer bellows 150 has a second port 162 with which tachometer 164 is in communication by means of connection 166. A bleed hole 168 is present in this connection. Tachometer bellows 152 also has a second port 170 with which tachometer 172 is in communication by means of connection 174. A bleed hole 176 is present in connection 174.

The tachometers 164 and 172 which indicate the assumed left and right motor speeds respectively may be of any suitable type provided their indications are responsive to the air pressure within the tachometer bellows to which each is connected, the lower the pressure within these bellows the higher the indicated speed given by the tachometer connected to that bellows.

As before explained in great detail, the pressure within the manifold pressure bellows 60, which bellows is shown in detail in Fig. 4, is dependent upon the compression upon the spring 62 which is associated with that bellows. Inasmuch as the tachometer bellows 150 and 152 are identical in all respects with the manifold pressure bellows 60, it will be realized that the pressure within each of these tachometer bellows depends on the compression upon the springs 178 and 180 which are associated with the tachometer bellows 150 and 152 respectively. A stop 182 is mounted upon the vertical link 184, the upper end of which is pivotally attached to the arm 40 to which reference has been previously made. The lower end of link 184 slides in the central opening in the extension 186 of bellows 150. In view of the detailed explanation of the functioning of spring 62 which is associated with the assumed left motor manifold pressure bellows 60 it will be readily understood that a movement up or down of the end of arm 40 to which link 184 is connected will decrease or increase respectively the compression upon spring 178 and will therefore cause an increase or decrease respectively in the pressure within bellows 150. A decrease or increase in the indicated motor speed as given by tachometer 164 will result.

Still referring to Fig. 3, it will be readily understood that an opening of the assumed left motor throttle 30 will cause link 38 to move downward and an increased compression upon spring 178 will result. Tachometer 164 will indicate an increased assumed left motor speed. A closing of throttle 30, i. e., a movement to the right in Fig. 3, will bring about an opposite indication.

In connection with the description of the assumed manifold pressure indicating systems of this invention, it was explained in detail that a pitching of the trainer fuselage in simulation of the climbing of the plane in actual flight causes the ends of arms 40 and 42 to which links 184 and 52 are respectively connected to move upwardly. A decrease in the compression upon spring 178 will therefore result and a like change will occur in the indicated assumed motor speed given by tachometer 164. On the other hand, a pitching of the trainer fuselage in simulation of the diving of a plane in actual flight will cause the end of arm 40 to which link 184 is connected to move downwardly, an increased compression upon spring 178 will result and tachometer 164 will reflect an increased assumed left motor speed.

Referring to the assumed right motor speed indicating system, link 188, stop 190 and spring 180 function exactly as do their counterparts in the left motor speed indicating systems. Therefore, it is deemed unnecessary to show in detail that with an opening of throttle 84 or with a pitching of the trainer fuselage 10 in simulation of the diving of a plane in actual flight an increased indication will be given by tachometer 172 and that with a closing of throttle 84 or with a pitching of trainer fuselage 10 in simulation of the climbing of a plane in actual flight this same instrument will give a decreased indication.

The foregoing discloses therefore means whereby the functioning of the tachometer or tachometers in a real airplane may be simulated in a grounded aviation trainer.

It will be appreciated by those familiar with the flying of actual aircraft that the air speed of the craft depends primarily upon two basic factors—the setting of the throttle lever or levers and the climbing and diving attitude of the plane. An opening of the throttle lever or levers and a diving of the plane causes an increase in air speed while a closing of the throttle lever or levers and a climbing of the plane results in a decrease in air speed. It has been explained that the vertical link 208 and walking beam 264 shown in Fig. 9 are always positioned according to the combined positions of the simulated throttle levers 30 and 84. The position of this walking beam may therefore be used as a measure of the assumed air speed of the trainer insofar as assumed air speed is dependent upon the setting of the simulated throttle levers. Also, when the fuselage 10 is placed in a diving position the upper end of walking beam 464 is moved toward the rear of the fuselage, in this instance the walking beam pivoting about the point 463, and a climbing of the fuselage 10 results in an opposite movement of the beam 464. Consequently, the position of the walking beam may be taken as a measure of the assumed air speed of the trainer because it is positioned in accordance with the combined positions of the throttle levers and fuselage attitude.

In Fig. 9 it will be seen that there is provided the link 500 which is pivotally connected to the walking beam 464 between the points 463 and 468. The fore end of link 500 is pivotally connected to the upper end of the air speed reversing arm 502 which pivots about the point 504. To the lower end of arm 502 is pivotally connected the rearwardly extending link 506 to the rear end of which is connected the spring 508. The rear end of spring 508 is connected to the link 510 which forms a part of the air speed bellows assembly designated generally 512. Reference is made to Fig. 10 which is a detailed disclosure of this assembly. In Fig. 10 the numeral 514 refers to the air proof bellows preferably made of light metal construction. This bellows may be mounted in any suitable manner upon a frame member 516 which in turn is mounted on the floor 37 of the fuselage 10. Within bellows 514 is a needle valve designated generally by 518 and comprising a seat 520 and a needle 522. Seat 520 is rigidly affixed to frame member 516 while needle 522 is attached to link 510 through suitable connecting means 524. The interior of bellows 514 is connected through the needle valve and line 526 to the manifold 412, as seen in Fig. 9. Also the interior of the bellows is connected by air line 527 to the simulated air speed instrument 528 in fuselage 10.

When the lower part of arm 502 is moved toward the head of the fuselage 10, link 506, spring 508, link 510, connecting means 524 and the forward end of bellows 514 will be pulled in the same direction. Bellows 514 will therefore be expanded and at the same time needle 522 will be pulled from its seat 520 and reduced air pressure from the manifold 412 will be applied through connection 526 to the bellows 514, and as is well known in the prior art, simulated air speed indicator 528 will indicate a higher assumed air speed. An opposite movement of lever 502 results in a lower indicated assumed air speed.

It will be appreciated, therefore, that a diving of the fuselage 10 will result in an increased indicated air speed while a climbing of the fuselage will result in a decreased indicated air speed, because lever 502 is responsive to the movements of walking beam 464. Further, inasmuch as the lever 502 is responsive to the combined positions of the simulated throttle levers 30 and 84, the indicated assumed air speed is responsive to the combined positions of these two simulated throttle levers just as the air speed in a dual engine plane is responsive to the combined positions of the throttle levers in the plane.

Previously in this description it was stated that in said companion application Serial No. 448,906, there was disclosed means whereby an assumed dual motor trainer may be made to rotate about its vertical axis when the throttle settings therein are unequal, thereby simulating the "rudder loading" which occurs in a dual motor plane when the engines are not synchronized. It was stated to be a further object of this invention to provide means whereby even though an unequal setting of the throttles be present, the turning of the trainer caused by such unequal throttle setting will be decreased as the trainer is banked, thereby simulating the diminishing of "rudder loading" as a real plane is banked.

Reference is now made to Figs. 5, 6, 7 and 8 which show in detail the construction of the 3-leaf valve 202. Fig. 5 shows in detail the construction of leaf 210 which is the leaf next to manifold 204 as seen in Fig. 3. This leaf has a central boring 212 extending completely therethrough and a counterbore 214 extending a substantial distance into the face of this leaf connects with central boring 212. Ports 216 and 218 extend completely through leaf 210 so that they are at all times in communication with the atmosphere.

Rigidly affixed to the rear face of leaf 210 by means of screws 220 as seen in Fig. 8 is an upstanding arm 222. As shown in Fig. 3, to the upper end of arm 222 is pivotally connected link 224. Leaf 210 is rotatably mounted upon hollow shaft 226 which is rigidly affixed to manifold 204. Line 228 connects this manifold with a constant source of vacuum, the duct 207 within manifold 204 communicating with port 205 in hollow shaft 226. Therefore, vacuum is present in this hollow shaft at all times. It will be realized therefore that vacuum enters hollow shaft 226 at all times and through port 230 in this hollow shaft, vacuum at all times is present in counterbore 214 which is in contact with the face of the middle leaf 232 as seen in Fig. 8. Atmosphere at all times enters ports 216 and 218 which likewise are in contact with the face of leaf 232. A plug 234 is in the end of hollow shaft 226 so that the vacuum may not escape therethrough. Within plug 234 is a threaded member 236 to the outer end of which is pivotally attached the upper end of link 208 which, as stated above, is intermediately connected with the air and vertical speed indicators and the altimeter.

Fig. 6 shows in detail the construction of the middle leaf 232. This leaf is also mounted upon hollow shaft 226 but cannot rotate thereupon because of the presence of screw 238. It will be seen that this leaf has a port 240 which extends completely therethrough and which is in perfect engagement with the counterbore 214 of leaf 210 when leaf 210 is in its central position. Fig. 8 shows that leaf in its central position. Two other ports 242 and 244 likewise extend completely through leaf 232 and are also in engagement with the ports 216 and 218 respectively when leaf 210 is in its central position. If leaf 210 be centered, therefore, reduced air pressure will be present in port 240 and atmospheric pressure will be present in ports 242 and 244. All three of these ports are in engagement with the face of leaf 246 as seen in Fig. 8.

The construction of leaf 246 is shown in detail in Fig. 7. It will be seen that rigidly affixed to the outer face of this leaf by means of the previously mentioned screws 200 is cross piece 196 to which reference has also been made. Two ports 248 and 250 extend from the bottom face of leaf 246 as seen in Fig. 8 a substantial distance within that leaf and then turn at right angles to communicate with the circular periphery of this leaf. A tubular piece 249 is inserted in this right angle extension of port 248 and a similar piece 251 is in like arrangement with port 250.

Whenever bar 196 is in the horizontal position, ports 248 and 250 are in relation to the ports 240, 242 and 244 of leaf 232 as shown in Fig. 6. The ports 248 and 250 are shown in dotted outline in that figure, and it will be seen that port 248 slightly overlaps port 242 while port 250 slightly overlaps port 244. Therefore, whenever bar 196 is in the horizontal position as seen in Fig. 3, atmosphere will be admitted to both of the ports 248 or 250 and will be applied to connections 252 and 254 which are connected to the outer extensions 249 and 251 of ports 248 and 250. As seen in Fig. 3, connection 252 is connected to bellows designated generally as 256 and a bleed hole 253 is present in this connection. Connection 254 is connected to bellows designated generally as 258 and bleed hole 255 is present in that connection. Bar 196 is in the horizontal position only in case both throttles 30 and 84 have a like setting and therefore whenever these throttles are thus set, bellows 256 and 258 will remain in their normal positions, i. e., filled with air at atmospheric pressure.

Referring to Fig. 3, in the event that throttle 30 be opened to a greater extent than throttle 84, link 194 will force the left end of bar 196 to a lower position than the right end of that bar will be forced by link 198. Leaf 246 to which bar 196 is connected will therefore rotate upon shaft 226 and port 248 of leaf 246 will communicate with port 240 of leaf 232 and port 250 of leaf 246 will communicate to a greater extent with port 244 of leaf 232. Vacuum will therefore be applied from port 240 to port 248 through connection 252 to bellows 256 while an increased amount of atmosphere will be applied through ports 244, 250 and connection 254 to bellows 258. Bellows 258 will therefore expand and bellows 256 will contract.

Referring to Fig. 3, the side 260 of bellows 256 is the side toward the front of the trainer and is rigidly affixed to any suitable stationary part of the trainer fuselage. The rear side 257 of this bellows is the movable side and has connected to its top by suitable pivotal means a link 261 which has its other end likewise attached to the left end of rudder bar 262. This bellows is, of course, made airproof. It will be appreciated that as bellows 256 expands and contracts, side 257 will move back and forth and rudder bar 262 through the action of link 261 will be made to turn about pivot 264. This movement will affect the position of rudder valve link 266 which controls the position of the rudder valve (not shown). As stated earlier in the description, a movement of link 266 will affect the rudder valve which in turn will cause the trainer to turn about its vertical axis as is described and claimed in U. S. Patent 2,099,857.

Bellows 258 is similar in all respects to bellows 256 and is connected to rudder bar 262 by means of link 268. It should be noted, however, that a contraction of bellows 258 has the same effect upon the position of rudder bar 262 and rudder valve link 266 as does an expansion of bellows 256.

Rudder pedals 270 and 272 are rotatably mounted upon the shaft 274 which is rigidly held by bracket 276. If rudder pedal 270 be pushed forward, link 278 which is attached to the lower extension of this rudder pedal at a point below shaft 274 will move to the rear, the left end of rudder bar 262 will move in the same direction and link 266 will move to the rear, thereby affecting the rudder valve and causing the trainer to turn to the left; but if rudder pedal 272 be pushed forward, link 280 will move in the opposite direction and the trainer will turn to the right. It is also to be noted that a contraction of bellows 258 affects rudder valve link 266 in the same manner as though pressure were applied to rudder pedal 270. The same is true of bellows 256 and pedal 272.

Therefore, whenever throttle 30 be opened to a greater extent than throttle 84, vacuum is admitted through connection 252 to bellows 256 and at the same time an increased amount of atmosphere is admitted through connection 254 to bellows 258. The former bellows will contract and the latter will expand. The right end of rudder bar 262 will move toward the rear of the trainer just as though pressure were applied to rudder pedal 272. Rudder valve link 266 will move toward the head of the trainer and the trainer will turn to the right. Bearing in mind the fact that throttle 84 which is the assumed right motor throttle is not opened as far as the assumed left motor throttle 30, it will be realized that the foregoing means cause the trainer to turn in the direction of the slower motor in exact simulation of the turning in the direction of the slower motor of a dual motored plane in actual flight. Such means are described and claimed in the aforementioned companion application Serial No. 448,906.

This turning of a dual motored plane in actual flight caused by a difference in motor speeds is diminished as such a plane is banked until when a certain angle of bank is reached the turning effect completely disappears. The following means are incorporated in the instant invention to simulate such a disappearance of "rudder loading" when a dual motored plane is banked.

Referring to Figs. 3, 5, and 8, it has been mentioned that an extension 222 is affixed to leaf 210 by means of screws 220. As seen in Fig. 3, to the upper end of this extension is pivotally connected link 224, the other end of which is pivotally connected to the upper end of arm 282. Arm 282 pivots about the point at which the shaft 286 is rigidly affixed thereto. The other end of this shaft is rigidly affixed to arm 288 which also pivots about the point where shaft 286 connects thereto.

To the lower end of lever 288 is pivotally connected the link 292 and the other end of link 292 is pivotally connected to the central support 15 of the trainer fuselage which is located below the universal joint 12. Arm 288 is pivotally mounted upon any suitable part of the interior of the trainer fuselage 10. It will be appreciated therefore that whenever the trainer is banked laterally in either direction, link 292 will cause arm 288 to pivot in one direction or the other, the extent of such rotation depending upon the degree of the bank. This movement of lever 288 will cause shaft 286 to rotate in one direction or the other and the rotation of this shaft will cause the upper end of arm 282 to move toward one side of the trainer fuselage or the other and therefore link 224 will likewise reciprocate, moving extension 222 and causing leaf 210 to rotate upon hollow shaft 226. The rotation of leaf 210 will move vacuum-filled counterbore 214 out of perfect engagement with port 240 of leaf 232, and atmospheric ports 216 and 218 will be moved out of exact engagement with ports 242 and 244 respectively of leaf 232. Therefore, less vacuum will be applied to port 240 and less atmosphere will be applied to ports 242 and 244. Consequently, less vacuum and less atmosphere will be applied to the ports 248 and 250 if the throttles of the trainer be in such a position that the ports in leaf 246 are in communication with the ports in leaf 232.

In illustration, let us assume that throttle 84 be opened to a greater extent than throttle 30, that is, it be moved farther to the left in Fig. 3 than throttle 30. Link 198 will be forced downwardly to a greater extent than link 194 and, therefore, port 250 of leaf 246 will communicate with port 240 of leaf 232 while port 248 of the former leaf will be in greater communication with port 242 of the latter leaf. Vacuum will be applied through connection 254 to bellows 258 while a greater amount of atmosphere will be applied through connection 252 to bellows 256. The former bellows will contract and the latter will expand and rudder valve link 266 will be moved so that the trainer will be made to turn to the left. Now assuming that the trainer be banked in either direction, by means of link 292, arm 288, link 286, arm 282, link 224 and arm 222, leaf 210 will be made to rotate upon hollow shaft 226 and vacuum-filled counterbore 214 will become out of perfect engagement with port 240, less vacuum will be applied to port 240 of leaf 232 and, therefore, less vacuum will be applied to port 250 of leaf 246. Likewise, a reduction in the amount of vacuum applied to bellows 258 will result and air entering bleed hole 255 will cause that bellows to expand. At the same time, less atmosphere will be applied through port 216 of leaf 210 to port 242 in leaf 232 and, therefore, a reduction in the amount of atmosphere entering port 248 of leaf 246 will result. A similar reduction will affect connection 252 and less atmosphere will enter bellows 256 which bellows therefore will be made to contract. The expansion of bellows 258 and the contraction of bellows 256 will offset the torque applied to rudder bar 262 as a result of the unequal throttle settings. The turning of the trainer to the left, caused by an opening of throttle 84 to a greater extent than throttle 30 will therefore be diminished by the banking of the trainer in either direction. If the trainer were turning in the opposite direction as a result of throttle 30 being opened farther than throttle 84, a banking of the trainer in either direction would likewise diminish the turning so caused.

In dual motored planes, there is often times provided means in addition to the pilot's applying his foot to one of the rudder pedals which may be used to prevent the turning of the plane in the direction of the slower motor.

In a real plane these means are of two types, one means providing its compensation through positioning the rudder pedals and the other through positioning a tab on the rudder of the plane. Inasmuch as such compensating means in the trainer must be related to the rudder valve, the following means which have been incorporated in my invention in order that the student in the trainer may have at his disposal means for accomplishing the same result may be considered to be of either type.

Referring to Fig. 3, it will be seen that a winch comprising a worm 296 and a worm wheel 298 are provided. An arm 300 is rigidly affixed to the wheel 298 so that whenever this wheel be rotated through a turning of worm 296 the link 302 which is pivotally attached to the upper end of arm 300 is moved one way or the other depending upon the direction of rotation of the wheel 298. The other end of link 302 will move arm 304 which in turn will cause the chain sprocket 306 to turn. The rotation of this sprocket will move chain 308 in one direction or the other and the tension upon the spring 310 will be increased or decreased and at the same time the tension upon spring 312 will be decreased or increased. Inasmuch as spring 310 is connected to link 314, the other end of which is connected to the upper end of rudder pedal 270 while the other end of spring 312 is connected to link 316 which has its other end connected to the upper part of rudder pedal 272, it will be realized that an increase in the tension upon spring 310 and the simultaneous decrease in the tension upon spring 312 will cause the rudder pedals to move in the same manner as though the student in the trainer were applying his left foot to left rudder pedal 270, while if the worm 296 be turned in such a direction that the tension upon spring 312 be increased and that upon spring 310 be decreased the rudder pedals will respond as though the student in the trainer were actually applying his right foot to rudder pedal 272. A suitable scale 318 and an index mark 320 on the wheel 298 are provided so that the student in the trainer, by referring to the tachometers 164 and 172 and thus learning the difference in the assumed motor speeds, may position the wheel 298 correctly to overcome the turning of the trainer caused by the unequal throttle settings.

In the event that one of the bellows 256 or 258 be substantially contracted through the application of vacuum by means of connections 252 or 254, the natural response of the student in the trainer would be to apply his foot to the rudder pedal on the side of the contracted bellows. In order to overcome the atmospheric force being exerted on the outside of the contracted bellows, the student would be required to exert an inordinately large amount of force on the pedal. In order to overcome this difficulty the links 261 and 268 are in reality positive type spring compensator link rods. The detailed construction of these links is shown in Fig. 3A. The left end 322 of this rod is connected to the upper part of the bellows 256 or 258 and the right end 324 is connected to rudder bar 262. Fixedly connected to part 324 is a housing 326. A slot 328 is present in each side of this housing and a stop 330 is attached to the end of link 322 as shown. This stop extends horizontally within housing 326 and the ends of this stop project through the slot 328 which is in either side of the housing 326. A compression spring 332 is within housing 326, one end of this spring bearing against the interior right end of housing 326 as seen in Fig. 3A and the other end bearing against the horizontal stop 330. Spring 332 is of such a compression that whenever either of the bellows 256 or 258 is collapsed by an application of vacuum thereto, the stop 330 does not move substantially in slots 328 and therefore the movement of rudder bar 262 is not substantially affected, but in the event that either bellows 256 or 258 be contracted because of the reduced air pressure therewithin, if the student in the trainer applies his foot to the rudder pedal 270 or 272 on the side of the contracted bellows, the movement of rudder bar 262 will cause a contraction of spring 332 and consequently, rudder bar 262 will be able to move even though the bellows in question continue to be contracted.

Therefore, my invention provides means in addition to applying his feet to the rudder pedals whereby the student in the trainer may overcome the turning of the trainer caused by a difference in the assumed motor speeds.

It may be concluded that my invention provides means whereby the response of an airplane and many of the instruments thereof to many conditions of actual flight may be simulated in a grounded aviation trainer. Changes may be made in the details of construction and arrangement of parts without departing from the spirit and scope of this invention. All such modifications are intended to be included within the following claims.

I claim:

1. In a grounded aviation trainer, means for simulating the functioning of a manifold pressure gauge in a real plane, said means comprising the combination of a simulated manifold pressure gauge, means in said trainer for actuating said simulated gauge to indicate assumed manifold pressures, a simulated throttle in said trainer, and means operated by said simulated throttle for causing said actuating means to cause said simulated gauge to register in accordance with the setting of said simulated throttle.

2. In a grounded aviation trainer comprising a fuselage capable of changing its attitude in simulation of the climbing and diving of a plane in actual flight means for simulating the functioning of a manifold pressure gauge in a real plane, said means comprising the combination of a simulated manifold pressure gauge, means in said trainer for actuating said simulated gauge to indicate assumed manifold pressures, and means responsive to the attitude of said fuselage for causing said actuating means to cause said simulated gauge to register in accordance with the attitude of said fuselage.

3. In a grounded aviation trainer comprising a fuselage capable of changing its attitude in simulation of the climbing and diving of a plane in actual flight means for simulating the functioning of a manifold pressure gauge in a real plane, said means comprising the combination of a simulated manifold pressure gauge, means in said trainer for actuating said simulated gauge to indicate assumed manifold pressures, a simulated throttle in said trainer, and means operated by the attitude of said fuselage as well as by said simulated throttle for causing said actuating means to cause said simulated gauge to register in accordance with the attitude of said fuselage and the position of said simulated throttle.

4. In a grounded aviation trainer, means for simulating the functioning of a manifold pressure gauge in a real plane, said means comprising the combination of a simulated manifold pressure gauge and means in said trainer for actuating said simulated gauge to indicate assumed manifold pressures; an equalizer tank within said trainer; means for varying the pressure within said equalizer tank according to the assumed altitude of said trainer; a throttle simulated member in said trainer; and means for causing said actuating means to cause said simulated gauge to register in accordance with the pressure within said equalizer tank; and means independent of said equalizer tank for causing said simulated gauge to register in response to the position of said throttle simulating member.

5. In a grounded aviation trainer comprising a fuselage capable of changing its attitude in simulation of the climbing and diving of a plane in actual flight means for simulating the functioning of a manifold pressure gauge in a real plane, said means comprising the combination of a simulated manifold pressure gauge and means in said trainer for actuating said simulated gauge to indicate assumed manifold pressures; an equalizer tank in said trainer; means for varying the pressure within said tank according to the assumed altitude of said trainer; and means for causing said actuating means to cause said simulated gauge to register in accordance with the pressure within said equalizer tank; and means independent of said equalizer tank for causing said simulated gauge to register in response to the attitude of said fuselage.

6. In a grounded aviation trainer comprising a fuselage capable of changing its attitude in simulation of the climbing and diving of a plane in actual flight means for simulating the functioning of a manifold pressure gauge in a real plane, said means comprising the combination of a simulated manifold pressure gauge and means in said trainer for actuating said gauge to indicate assumed manifold pressures; an equalizer tank in said trainer; means for varying the pressure within said tank in accordance with the assumed altitude of said trainer; a throttle simulating member in said trainer; means for causing said actuating means to cause said simulated gauge to register in accordance with the pressure within said tank; and means independent of said equalizer tank for causing said simulated gauge to register in response to the attitude of said fuselage and position of said throttle simulating member.

7. In a grounded aviation trainer, means for simulating the functioning of a manifold pressure gauge and a tachometer in a real plane, said means comprising the combination of a simulated manifold pressure gauge means in said trainer for actuating said simulated gauge to indicate assumed manifold pressures, a simulated tachometer and means in said trainer for actuating said simulated tachometer to indicate assumed motor speeds, a simulated throttle in said trainer, and means operated by said simulated throttle for causing said first-mentioned actuating means to cause said simulated manifold pressure gauge and the other of said actuating means to cause said simulated tachometer to register in accordance with the setting of said simulated throttle.

8. In a grounded aviation trainer comprising a fuselage capable of changing its attitude in simulation of the climbing and diving of a plane in actual flight means for simulating the functioning of a manifold pressure gauge and a tachometer in a real plane, said means comprising the combination of a simulated manifold pressure gauge, means in said trainer for actuating said simulated gauge to indicate assumed manifold pressures, a simulated tachometer in said trainer and means in said trainer for actuating said simulated tachometer to indicate assumed motor speeds, and means responsive to the attitude of said fuselage for causing said first-mentioned actuating means to cause said simulated manifold pressure gauge and the other of said actuating means to cause said simulated tachometer to register in accordance with the attitude of said fuselage.

9. In a grounded aviation trainer comprising a fuselage capable of changing its attitude in simulation of the climbing and diving of a plane in actual flight means for simulating the functioning of a manifold pressure gauge and a tachometer in a real plane, said means comprising the combination of a simulated manifold pressure gauge, means in said trainer for actuating said simulated gauge to indicate assumed manifold pressures, a simulated tachometer and means in said trainer for actuating said simulated tachometer to indicate assumed motor speeds, a simulated throttle in said trainer, and means responsive to the attitude of said fuselage as well as to the position of said simulated throttle for causing said first-mentioned actuating means to cause said simulated gauge and the other of said actuating means to cause said simulated tachometer to register in accordance with the attitude of said fuselage as well as the setting of said simulated throttle.

10. In a grounded aviation trainer, means for simulating the functioning of a manifold pressure gauge and a tachometer in a real plane, said means comprising the combination of a simulated manifold pressure gauge, means in said trainer for actuating said gauge to indicate assumed manifold pressures, a simulated tachometer and means in said trainer for actuating said simulated tachometer to indicate assumed motor speeds, a throttle simulating member and an equalizer tank within said trainer, means for varying the pressure within said tank according to the assumed altitude of said trainer, and means for causing said first-mentioned actuating means to cause said simulated manifold pressure gauge to register in accordance with the position of said throttle simulating member and the pressure within said equalizer tank and the other of said actuating means to cause said simulated tachometer to register in accordance with the position of said throttle simulating member.

11. In a grounded aviation trainer comprising a fuselage capable of changing its attitude in simulation of the climbing and diving of a plane in actual flight, means for simulating the functioning of a manifold pressure gauge and a tachometer in a real plane, said means comprising the combination of a simulated manifold pressure gauge, means in said trainer for actuating said simulated gauge to indicate assumed manifold pressures, a simulated tachometer and means in said trainer for actuating said simulated tachometer to indicate assumed motor speeds, an equalizer tank in said trainer, means for varying the pressure within said tank according to the assumed altitude of said trainer, and means for causing said first-mentioned actuating means to cause said simulated manifold pressure gauge to register in accordance with the attitude of said fuselage as well as the pressure within said equalizer tank and the other of said actuating means to cause said simulated tachometer to register in accordance with the attitude of said fuselage.

12. In a grounded aviation trainer comprising a fuselage capable of changing its attitude in simulation of the climbing and diving of a plane in actual flight, means for simulating the functioning of a manifold pressure gauge and a tachometer in a real plane, said means comprising the combination of a simulated manifold pressure gauge, means in said trainer for actuating said simulated gauge to indicate assumed manifold pressures, a simulated tachometer in said trainer and means in said trainer for actuating said simulated tachometer to indicate assumed motor speeds, a simulated throttle and an equalizer tank within said trainer, means for varying the pressure within said tank according to the assumed altitude of said trainer, and means for causing said first-mentioned actuating means to cause said simulated manifold pressure gauge to register in accordance with the attitude of said fuselage, the pressure within said equalizer tank and the position of said simulated throttle and the other of said actuating means to cause said simulated tachometer to register in accordance with the attitude of said fuselage and the position of said simulated throttle.

13. In a grounded aviation trainer, means for simulating the functioning of the manifold pressure gauges in a plural engine aircraft, said means comprising the combination of a plurality of simulated manifold pressure gauges, a plurality of independent means in said trainer for actuating each of said simulated gauges to indicate assumed manifold pressures, a plurality of simulated throttles in said trainer, one of said simulated throttles being associated with each of said actuating means, and means for causing each of said actuating means to cause its associated simulated gauge to register in accordance with the setting of its associated simulated throttle.

14. In a grounded aviation trainer comprising a fuselage capable of changing its attitude in simulation of the climbing and diving of a plane in actual flight, means for simulating the functioning of the manifold pressure gauges in a plural engine aircraft comprising the combination of a plurality of simulated manifold pressure gauges, means in said trainer for actuating each of said simulated gauges to indicate assumed manifold pressures, and means operated by said fuselage for causing said actuating means to cause each of said simulated gauges to register in accordance with the attitude of said fuselage.

15. In a grounded aviation trainer, means for simulating the functioning of the manifold pressure gauges in a plural engine aircraft, said means comprising the combination of a plurality of simulated manifold pressure gauges, means in said trainer for actuating each of said simulated gauges to indicate assumed manifold pressures, an equalizer tank within said trainer, means for varying the pressure within said equalizer tank according to the assumed altitude of said trainer, and means responsive to the pressure within said equalizer tank for causing said actuating means to cause each of said simulated gauges to register in accordance with the pressure within said equalizer tank.

16. In a grounded aviation trainer comprising a fuselage capable of changing its attitude in simulation of the climbing and diving of a plane in actual flight, means for simulating the functioning of the manifold pressure gauges in a plural engine aircraft comprising the combination of a plurality of simulated manifold pressure gauges, a plurality of independent means in said trainer for actuating each of said simulated gauges to indicate assumed manifold pressures, a plurality of simulated throttles in said trainer, one of said simulated throttles being associated with each of said actuating means, and means operable by each of said simulated throttles for causing its associated actuating means to cause its associated simulated gauge to register in accordance with the setting of its associated simulated throttle, and means for causing each of said simulated gauges to register in accordance with the attitude of said fuselage.

17. In a grounded aviation trainer, means for simulating the functioning of the manifold pressure gauges in a plural engine plane, said means comprising the combination of a plurality of simulated manifold pressure gauges, a plurality of independent means in said trainer for actuating each of said simulated gauges to indicate assumed manifold pressures, a plurality of simulated throttles in said trainer, one of said simulated throttles being connected with each of said actuating means, an equalizer tank in said trainer, means for varying the pressure within said tank according to the assumed altitude of said trainer, and means operable by each of said simulated throttles for causing its associated actuating means to cause its associated simulated gauge to register in accordance with the setting of its associated simulated throttle, and means for causing each of said gauges to register in accordance with the pressure within said equalizer tank.

18. In a grounded aviation trainer comprising a fuselage capable of changing its attitude in simulation of the climbing and diving of a plane in actual flight, means for simulating the functioning of the manifold pressure gauges in a plural engine plane comprising the combination of a plurality of simulated manifold pressure gauges, a plurality of independent means in said trainer for actuating each of said simulated gauges to indicate assumed manifold pressures, a plurality of simulated throttles in said trainer, one of said simulated throttles being associated with each of said actuating means, an equalizer tank in said trainer, means for varying the pressure within said tank according to the assumed altitude of said trainer, and means for causing each of said actuating means to cause its associated simulated gauge to register in accordance with the setting of its associated simulated throttle, the attitude of said fuselage and the pressure within said equalizer tank.

19. In a grounded aviation trainer the combination of, a plurality of simulated manifold pressure gauges, independent means in said trainer for actuating each of said simulated gauges to indicate assumed manifold pressures, a simulated air speed indicator in said trainer, means responsive to certain controls in said trainer for actuating said simulated indicator to indicate assumed air speeds, and a plurality of simulated throttles in said trainer, one of said simulated throttles being associated with each of said simulated gauge actuating means, and all of said simulated throttles being associated with said simulated air speed indicator actuating means, means for causing each of said simulated gauge actuating means to cause its associated simulated gauge to register in accordance with the position of its associated simulated throttle, and means for causing said simulated air speed indicator to register in accordance with the combined positions of said simulated throttles.

20. In a grounded aviation trainer, the combination of a plurality of simulated manifold pressure gauges, independent means in said trainer for actuating each of said simulated gauges to indicate assumed manifold pressures, an equalizer tank within said trainer, means for varying the pressure within said tank, a simulated instrument connected to said equalizer tank and responsive to the pressure therewithin, a plurality of simulated throttles in said trainer, one of said simulated throttles being associated with each of said simulated gauge actuating means, and all of said simulated throttles being associated with said means for varying the pressure within said tank, means for causing each of said gauge actuating means to cause its associated simulated manifold pressure gauge to register in accordance with the position of its associated simulated throttle, and means for varying the pressure within said equalizer tank in accordance with the combined positions of said simulated throttles.

21. In a grounded aviation trainer the combination of a plurality of simulated tachometers, a plurality of independent means in said trainer for actuating each of said simulated tachometers to indicate assumed motor speeds, a plurality of simulated throttles in said trainer, one of said simulated throttles being associated with each of said actuating means, a simulated air speed indicator in said trainer, means in said trainer for causing said indicator to indicate assumed air speeds, all of said simulated throttles being associated with said last-mentioned actuating means, and means for causing each of said simulated tachometer actuating means to cause its associated simulated tachometer to register in accordance with the position of its associated simulated throttle, and means for causing said simulated air speed indicator to register in accordance with the combined positions of said simulated throttles.

22. In a grounded aviation trainer the combination of a plurality of simulated tachometers, a plurality of independent means in said trainer for actuating each of said simulated tachometers to indicate assumed motor speeds, a plurality of simulated throttles in said trainer, one of said simulated throttles being associated with each of said actuating means, an equalizer tank within said trainer, means for varying the pressure within said tank, all of said simulated throttles being associated with said last-mentioned means, a simulated instrument connected to said equalizer tank and responsive to the pressure therewithin, and means for causing each of said simulated tachometer actuating means to cause its associated simulated tachometer to register in accordance with the position of its associated simulated throttle, and means for varying the pressure within said equalizer tank in accordance with the combined positions of said simulated throttles.

23. In a grounded aviation trainer, means for simulating the functioning of a manifold pressure gauge and an air speed indicator in a real plane, said means comprising the combination of a simulated manifold pressure gauge and a simulated air speed indicator, means in said trainer for actuating said simulated gauge to indicate assumed manifold pressures and means in said trainer for actuating said simulated air speed indicator to indicate assumed air speeds, a simulated throttle in said trainer, and means operated by said simulated throttle for causing both of said actuating means to cause said simulated manifold pressure gauge and said simulated air speed indicator to register in accordance with the setting of said simulated throttle.

24. In a grounded aviation trainer the combination of a fuselage rotatably mounted upon a stationary base, means for rotating said fuselage about its vertical axis, a plurality of simulated tachometers in said fuselage, a plurality of independent means in said trainer for actuating each of said simulated tachometers to indicate assumed motor speeds, a plurality of simulated throttles in said trainer, one of said simulated throttles being associated with each of said actuating means, means for causing said rotating means to rotate said fuselage according to the relative positions of said throttles, and means for causing each of said simulated tachometer actuating means to cause its associated simulated tachometer to register in accordance with the position of its associated simulated throttle.

25. In a grounded aviation trainer the combination of a fuselage rotatably mounted upon a universal joint, means for banking said fuselage in simulation of the banking of an airplane in actual flight and means for rotating said fuselage about its vertical axis, a plurality of simulated throttles within said fuselage, means for causing said rotating means to rotate said fuselage according to the relative positions of said simulated throttles, and additional means responsive to the lateral position of said fuselage for diminishing the rotation of said fuselage caused by said relative simulated throttle positions whenever said fuselage is banked.

26. In a grounded aviation trainer the combination of a fuselage rotatably mounted upon a universal joint, means for banking said fuselage laterally in simulation of the banking of an airplane in actual flight, means for rotating said fuselage about its vertical axis, a plurality of simulated throttles within said fuselage, and a control element for controlling the rotation of said fuselage responsive to the combined settings of said simulated throttles as well as to the lateral position of said fuselage, said control element causing said rotating means to rotate said fuselage according to the relative positions of said simulated throttles as well as the lateral position of said fuselage.

27. In a grounded aviation trainer the combination of a fuselage rotatably mounted upon a universal joint, means for rotating said fuselage about its vertical axis according to the position of a control element, a plurality of simulated throttles in said fuselage, the position of said control element being responsive to the combined positions of said simulated throttles, and manually operable means for offsetting the positioning of said control element caused by the combined positions of said simulated throttles.

28. In a grounded aviation trainer the combination of a fuselage rotatably mounted upon a universal joint, means for rotating said fuselage about its vertical axis according to the position of a control element, a plurality of simulated throttles and a pair of simulated rudder pedals in said fuselage, the position of said control element being responsive to the combined positions of said simulated throttles as well as the position of said simulated rudder pedals, and manually operable means in addition to said simulated throttles and said simulated rudder pedals for positioning said control element.

29. In an airplane trainer including a turnable cockpit, and control means for turning the cockpit, the combination therewith of a pair of simulated manifold pressure gauges to indicate assumed manifold pressures, a plurality of independent means in said trainer for actuating each of said simulated gauges, a plurality of simulated throttle control levers in said trainer, one of said simulated throttles being associated with each of said actuating means, means for causing said control means to rotate said trainer according to the relative positions of said throttles, and means for causing each of said simulated gauge actuating means to actuate its associated gauge to register in accordance with the position of its associated throttle.

30. In a grounded aviation trainer, means for simulating the functioning of a manifold pressure gauge in a real airplane, said means comprising the combination of a simulated manifold pressure gauge and means for actuating said simulated gauge to indicate assumed manifold pressures; an equalizer tank within said trainer; means for varying the pressure within said tank according to the assumed altitude of the trainer; means responsive to the pressure within said tank for causing said actuating means to cause said simulated gauge to register in accordance with the assumed altitude of said trainer; and additional means operatively connected to said actuating means for affecting the indication of said simulated gauge.

31. In a grounded aviation trainer, means for simulating the functioning of a manifold pressure gauge in a real plane, said means comprising, in combination, a simulated manifold pressure gauge, means forming a part of said trainer arranged to be operable in response to the movements of a throttle control simulating member in said trainer and means forming a part of said trainer operable in response to changes in the assumed altitude of said trainer, means interconnecting the means responsive to the throttle control simulating member and said gauge for changing the reading of said gauge in response to the operations of said means responsive to the throttle control simulating member, and means interconnecting said altitude-responsive means and said gauge for changing the reading of said gauge in response to the operations of said altitude-responsive means.

32. In a grounded aviation trainer, the combination of an instrument in said trainer simulating the altimeter of a real plane, means in said trainer for actuating said instrument to indicate assumed altitudes, a plurality of means in said trainer each responsive to a different one of a plurality of throttle control simulating members, and means interconnecting the plurality of means responsive to the throttle control simulating members and said instrument actuating means for causing said actuating means to cause said indicator to register in accordance with the combined effect of said means responsive to the throttle control simulating members.

33. In a grounded aviation trainer, the combination of an instrument in said trainer simulating the vertical speed indicator of a real plane, means in said trainer for actuating said instrument to indicate assumed vertical speeds, a plurality of means in said trainer each responsive to a different one of a plurality of throttle control simulating members, and means interconnecting the plurality of means responsive to the throttle control simulating members and said instrument actuating means for causing said actuating means to cause said indicator to register in accordance with the combined effect of said means responsive to the throttle control simulating members.

KARL A. KAIL.

REFERENCES CITED

The following references are of record in the file of this patent:

UNITED STATES PATENTS

| Number | Name | Date |
|---|---|---|
| 1,825,462 | Link | Sept. 29, 1931 |
| 2,099,857 | Link | Nov. 23, 1937 |
| 2,212,931 | Colvin | Aug. 27, 1940 |
| 2,301,685 | De Florez | Nov. 10, 1942 |
| 2,366,603 | Dehmel | Jan. 2, 1945 |